United States Patent [19]
Hiller

[11] 4,383,628
[45] May 17, 1983

[54] TRAVERSE FOR USE IN LUGGAGE RACKS OF AUTOMOTIVE VEHICLES OR THE LIKE

[75] Inventor: Rolf Hiller, Kippenheim, Fed. Rep. of Germany

[73] Assignee: Hiller Vertriebs-GmbH für Fahrzeugteile, Schmieheim, Fed. Rep. of Germany

[21] Appl. No.: 245,178

[22] Filed: Mar. 18, 1981

[30] Foreign Application Priority Data

Mar. 26, 1980 [DE] Fed. Rep. of Germany ....... 3011641

[51] Int. Cl.³ .......................... B60R 9/04; B60R 9/12
[52] U.S. Cl. ...................................... 224/319; 211/4;
211/60 R; 224/321; 224/322; 224/325;
224/917; 248/226.3; 248/230; 403/347;
403/363
[58] Field of Search ............... 224/309, 917, 314, 315,
224/316, 319, 322, 323, 324, 325, 326, 321;
248/225.3 R, 226.3, 230; 403/347, 346, 363;
211/182, 60 R, 68, 60 T, 4, 7; 280/814

[56] References Cited

U.S. PATENT DOCUMENTS

| 285,605 | 9/1883 | Flora | 403/347 X |
| 491,297 | 2/1893 | Stowe | 403/373 X |
| 1,798,572 | 3/1931 | Welton | 248/230 X |
| 3,181,753 | 5/1965 | Fitch | 224/326 X |
| 3,242,704 | 3/1966 | Barreca | 224/917 X |
| 4,081,118 | 3/1978 | Mason | 224/325 X |

FOREIGN PATENT DOCUMENTS 2225009 10/1974 France .............................. 224/324

Primary Examiner—Allan N. Shoap
Attorney, Agent, or Firm—Kontler, Grimes & Battersby

[57] ABSTRACT

A luggage rack which is mounted on the roof of an automotive vehicle and has two longitudinally extending parallel rod-shaped carriers and several traverses separably connected to and extending at right angles to the carriers. Each traverse has an elongated outer section and an elongated inner section which is telescoped into and is movable lengthwise and/or at right angles to the outer section. The sections of each traverse have intersecting sockets in the form of elongated open-ended slots receiving parts of the carriers so that the surface bounding the slots contact the respective carrier parts. Screws which extend through the outer sections and mate with nuts on or in the inner sections bias the sections of each traverse against each other and against the respective parts of the carriers to thereby fixedly hold the traverses in selected positions. The inner section of each traverse may have a circular, oval, U-shaped or polygonal outline, and the outer section of each traverse may have a U-shaped circular, oval or other suitable outline.

28 Claims, 8 Drawing Figures

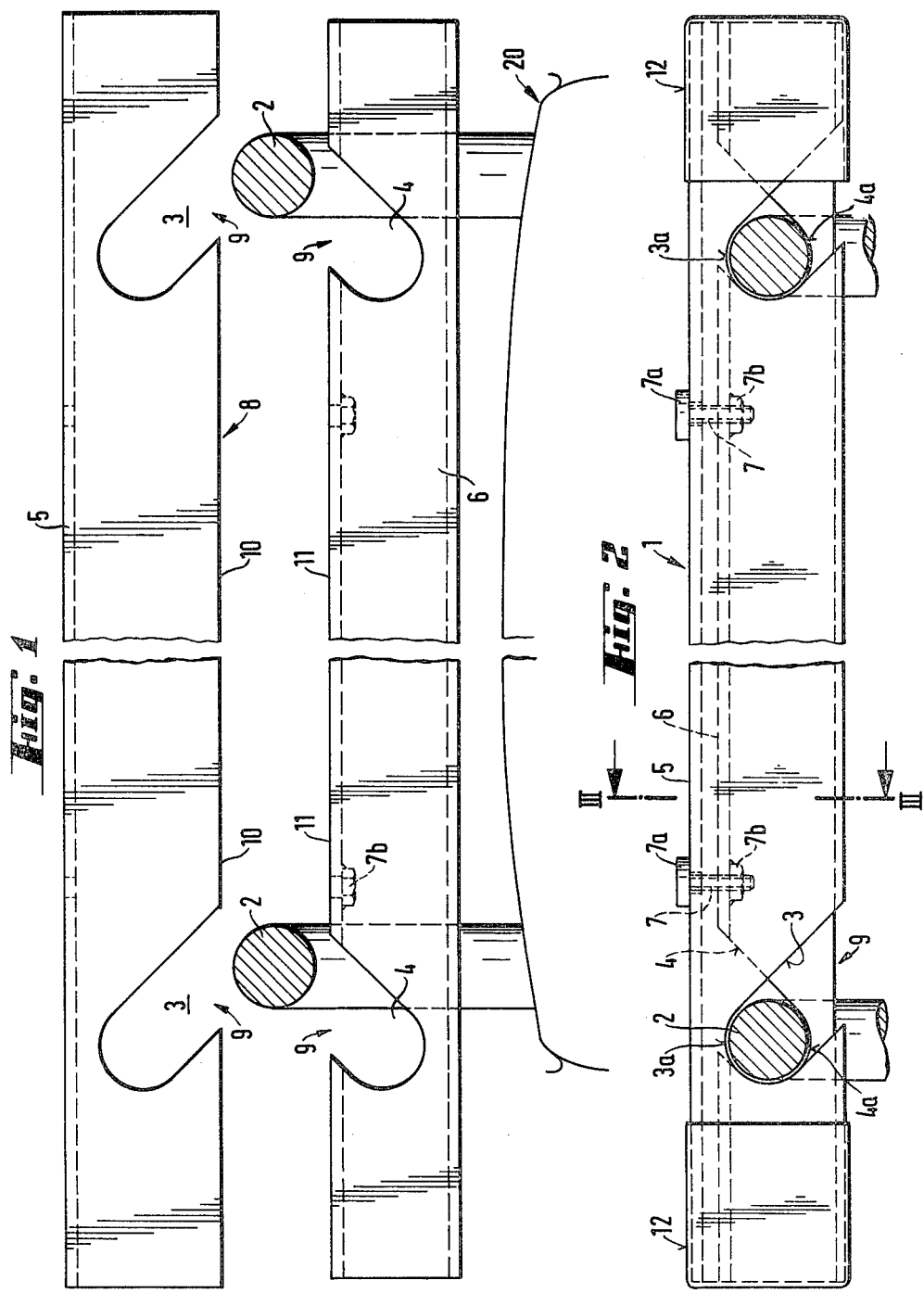

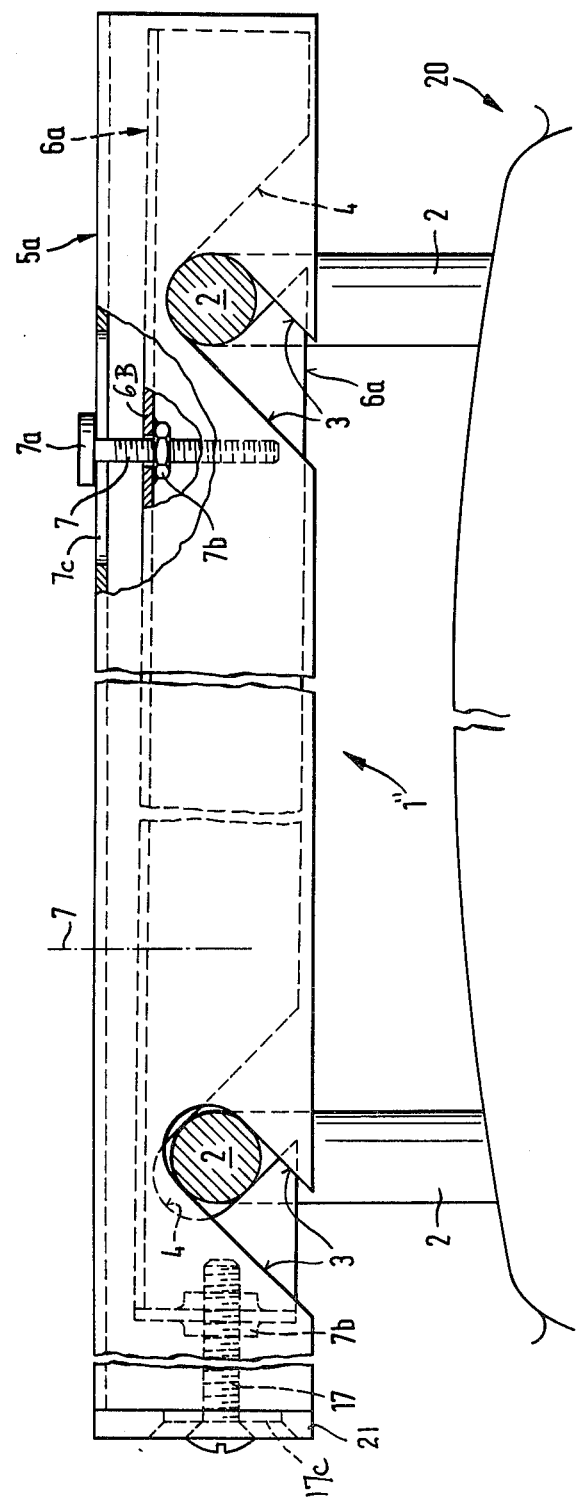

TRAVERSE FOR USE IN LUGGAGE RACKS OF AUTOMOTIVE VEHICLES OR THE LIKE

BACKGROUND OF THE INVENTION

The present invention relates to racks or analogous frameworks, especially to racks which can be used to store, support and/or confine luggage, skis and other commodities on the roofs of automotive vehicles or the like. More particularly, the invention relates to improvements in frameworks of the type wherein one or more crosspieces or traverses are secured to a plurality of bars or analogous carriers which, in turn, are or may be permanently or separably secured to the roof of an automotive vehicle or the like. The vehicle which is or can be provided with a framework of the just outlined character may constitute a road vehicle or another type of vehicle, e.g., a watercraft.

It is already known to provide the roof of a vehicle, e.g., a road vehicle of the type known as a caravan vehicle, with a pair of elongated bars or analogous carriers which extend in the longitudinal direction of the vehicle, i.e., in parallelism with the direction of forward movement, and form part of a framework or rack that further includes one or more transversely extending traverses or crosspieces. The carriers can be permanently or separably mounted on the roof of the vehicle and each traverse is separably or permanently mounted on the carriers to serve as a support and/or as a confining means for luggage, skis and/or other bulky commodities which cannot be readily stored in the trunk and/or in the passenger compartment of the conveyance. The traverse or traverses may constitute discrete components of the rack or they may form part of receptacles which, in turn, serve for storage of suitcases or the like. Road vehicles with carriers in the form of bars which are parallel to the direction of forward movement and are permanently installed on the roof of the vehicle include the so-called T-models of the German automobile firm Daimler Benz as well as the AMC Spirit Sedan 81, Chrysler LeBaron Wagon 81 and the Plymouth Volare Wagon 81.

A drawback of present known racks or frameworks of the above outlined character is that the mounting of traverse on and/or the detachment of traverse from the carriers takes up too much time and that the traverse are likely to become loose. Moreover, the mounting of traverses is not burglarproof so that an unauthorized person can readily detach the traverses from the carriers and get away with the suitcases, skis and/or other commodities which are not directly and non-removably secured to the permanently installed carriers. Furthermore, the detachable traverses of presently known frameworks or racks are not likely to remain in selected positions and they are often configured in such a way that they offer excessive resistance to forward movement of the vehicle. The just outlined drawbacks are present regardless of whether the frameworks are installed on the roofs of road vehicles, watercraft or other types of conveyances.

OBJECTS AND SUMMARY OF THE INVENTION

An object of the invention is to provide a novel and improved framework, especially a rack for use on the roof of an automotive vehicle, which is constructed and assembled in such a way that the traverse or traverses can be readily attached to or separated from their carriers by resorting to rudimentary tools, by the exertion of relatively small forces, by persons having little or no mechanical skill, and in such a way that they remain in selected positions with reference to the carriers for any desired period of time.

Another object of the invention is to provide the framework of the above outlined character with novel and improved traverses which are constructed and assembled in such a way that their adherence or their positions relative to the carrier or carriers can be selected practically at will, which can be used in combination with carriers that are not or need not be located at a predetermined distance from each other, and which can properly grip carriers in the form of bars, rods or the like.

A further object of the invention is to provide relatively simple, inexpensive, rugged and eye-pleasing traverse for use in frameworks of the above outlined character and to construct and assemble the traverses in such a way that they offer little resistance to forward movement of a vehicle if the framework which embodies such traverses is installed on the roof of a vehicle.

An additional object of the invention is to provide the traverses with novel and improved fastener means for separably securing their components or constituents to the carriers of a framework, especially a luggage rack or the like.

A further object of the invention is to provide traverses which embody the above outlined features and may constitute discrete parts or portions of larger components, such as receptacles for suitcases or the like.

An additional object of the invention is to provide a luggage rack which embodies the above outlined traverse or traverses and to provide an automotive vehicle, a sailing craft or another conveyance which embodies the improved framework.

The invention is embodied in a framework, particularly in a rack for storage of luggage, skis or other commodities on the roof of an automotive vehicle. The framework comprises a plurality of spaced-apart elongated carriers (e.g., two parallel bars or rods which are mounted on the roof of an automobile and extend in parallelism with the direction of forward movement of the vehicle), and at least one traverse or crosspiece extending transversely of the carriers and comprising a plurality of elongated sections consisting of aluminum, an aluminum alloy, stainless steel, a synthetic plastic material or any other suitable substance which exhibits the necessary rigidly and resistance to corrosion. The sections of each traverse are telescoped into and are movable relative to each other (the movements may take place in the longitudinal direction of the sections and/or at right angles to such direction), and each section comprises a plurality of open-ended sockets (preferably in the form of elongated slots which make oblique angles with the longitudinal directions of the respective sections) including registering portions for parts of the carriers, and each traverse further comprises fastener means for releasably securing the sections of the traverse to each other so that the sections engage the carriers and cannot be accidentally detached therefrom. The fastener means may comprise one or more externally threaded members extending through one section (e.g., through the outer section of two sections further including an inner section which is telescoped into the outer section) and meshing with suitable nuts provided on or in the other (inner) section. The positions and/or inclinations of the externally threaded members can be selected in such a way that they can urge the surfaces bounding the sockets of the sections against the parts of the respective carriers to thus establish a requisite frictional engagement between the carriers and the respective traverse. Moreover, the fastener means can urge the sections of a traverse toward and/or against each other so as to prevent such sections from performing undesired or accidental movements relative to each other.

The novel features which are considered as characteristic of the invention are set forth in particular in the appended claim. The improved framework itself, however, both as to its construction and the mode of assembling the same, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary exploded partly transverse vertical sectional view of a framework which constitutes a rack on the roof of an automotive vehicle and embodies one form of the invention, the sections of the traverse shown in FIG. 1 including an inverted U-shaped outer section and a tubular inner section of polygonal cross-sectional outline;

FIG. 2 illustrates the structure of FIG. 1 in assembled condition and further shows two externally threaded members which connect the inner and outer sections of the illustrated traverse to each other, the end portions of the traverse being provided with caps to prevent or reduce the likelihood of penetration of foreign matter into the interior of the sections;

FIG. 7 is a transverse vertical sectional view of a fourth framework wherein the fastener means of the illustrated traverse comprises discrete means for moving the sections of the traverse axially of each other as well as at right angles to their longitudinal directions; and FIG. 8 is a perspective view of an automotive vehicle with a rack which is mounted on the roof of the vehicle and embodies one form of the present invention, the portion which is shown on a larger scale within a phantom-line circle indicating that the respective traverse is assembled of two elongated sections each having a U-shaped cross-sectional outline.

DESCRIPTION OF THE PREFERRED EMBODIMENTS

Figure 3:
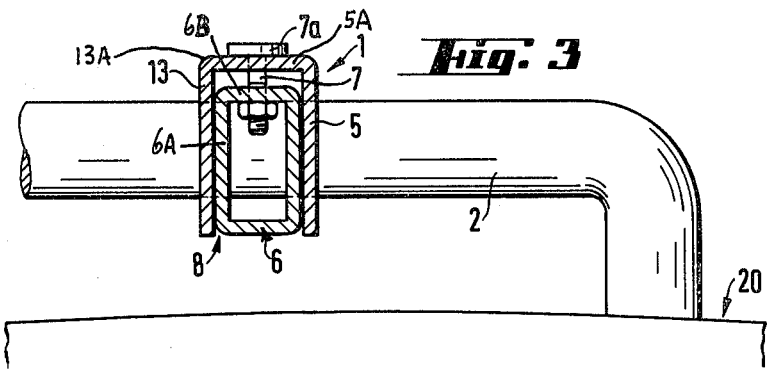
FIG. 3 is a transverse vertical sectional view as seen in the direction of arrows from the line III—III of FIG. 2.

Referring first to FIGS. 1 to 3, there is shown a portion of the roof 20 of an automotive vehicle, such as a passenger car of the type shown in FIG. 8, which carries a rack or framework including two elongated parallel carriers in the form of bars 2 having a circular cross-sectional outline and two traverses or crosspieces 1 of which only one can be seen in FIGS. 1 to 3. The traverses 1 can constitute discrete components of the framework or they may constitute integral or separable parts of other components of the framework, e.g., integral parts of receptacles for suitcases or the like. Alternatively, the traverses 1 can serve as a means for detachably supporting skis, ski poles, masts of sailboats or the like.

The traverse 1 which is illustrated in FIGS. 1 to 3 comprises a plurality of elongated sections including an outer section 5 having an inverted U-shaped cross-sectional outline and a tubular inner section having a polygonal (rectangular) cross-sectional outline. The section 6 is telescoped into and is movable lengthwise of as well as at right angles to the longitudinal direction of the section 5. The width of the opening 8 at the underside 10 of the outer section 5 (the underside 10 faces the roof 20 of the vehicle) is such that the section 6 can be introduced (vertically, as viewed in FIG. 3) into the interior of or withdrawn from the section 5 by moving the section 6 up or down. The inner section 6 has an upper side 11 which faces away from the underside 10 of the outer section 5, and the sides 10, 11 of the sections 5 and 6 are respectively formed with open-ended sockets 3 and 4 in the form of elongated slots having a constant width and being inclined (preferably at an angle of approximately 45 degrees) to the longitudinal directions of the respective sections. It will be noted that the two sockets or slots 3 of the section 5 are parallel to each other, that the two sockets or slots 4 of the section 6 are also parallel to each other, and that the sockets or slots 3 intersect the sockets or slots 4 when the traverse 1 is fully assembled so that certain portions of the adjacent or neighboring sockets 3, 4 overlap or intersect each other and such intersecting portions receive parts of the respective carriers or bars 2. The open ends of the sockets 3 are located at the side 10 of the section 5, and the open ends of the sockets 4 terminate at the side 11 of the section 6. Since the traverse 1 of FIGS. 1 to 3 further comprises fastener means which hold the properly assembled sections 5 and 6 against movement relative to each other and/or relative to the carriers 2, the framework including such traverse and the carriers is held together so that it can support pieces of luggage, skis and/or other commodities which do not readily fit into the trunk and/or into the passenger compartment of the vehicle.

Since the longitudinal directions of the slot-shaped sockets 3 and 4 preferably make oblique angles of approximately 45 degrees with the longitudinal directions of the respective sections 5 and 6, the longitudinal directions of each pair of intersecting sockets 3, 4 make angles of approximately 90 degrees (see FIG. 2) and the surfaces bounding the sockets 3 and 4 engage the external surfaces of the respective parts of the carriers 2. As shown in FIG. 2, the distance between the carriers 2 and the distance between the sockets 3 and 4 in the respective sections 5 and 6 can be readily selected in such a way that the parts of the carriers 2 which are confined in the sockets 3 and 4 are received in the innermost portions 3a, 4a of the respective sockets. This provides for a substantial surface-to-surface contact between the sections 5, 6 on the one hand and the parts of the two carriers 2 on the other hand. It will be noted that the inclination of sockets 3 is opposite to that of the sockets 4 but that the inclination of all sockets 3 or 4 is the same. Such orientation of sockets 3 and 4 ensures a highly satisfactory and reliable retention of parts of the carriers 2 in the overlapping or intersecting portions of the respective sockets 3 and 4. The reference characters 9 denote the open ends of the sockets 3 and 4 in the sides 10 and 11 of the corresponding sections 5 and 6.

FIG. 1 shows that, in order to assemble the inner section 6 with the carriers 2, the section 6 must be moved upwardly and in a direction to the right. The outer section 5 is assembled with the inner section 6 and with the carriers 2 by moving it downwardly and in a direction to the right, as viewed in FIG. 1, so that it assumes the position of FIG. 2 or 3 in which its flanges 13 are outwardly adjacent to the respective side walls or panels 6A of the inner section 6. An advantage of the embodiment of FIGS. 1 to 3 is that the inverted U-shaped outer section 5 allows for insertion of the inner section 6 by moving the latter axially of the section 5 and/or at right angles to the longitudinal direction of the section 5.

The fastener means which releasably or separably secures the sections 5 and 6 to each other and to the carriers 2 comprises two externally threaded members 7 in the form of screws having heads 7a which are outwardly adjacent to the upper side of the outer section 5 and shanks which mesh with nuts 7b welded to the inner side of the upper wall or panel 6B of the inner section 6. The nuts 7b can be omitted if the wall 6B is provided with tapped bores for the shanks of the screws 7. It will be noted that the nuts 7b register with the shanks of the corresponding screws 7 when the selected parts of the carriers 2 are disposed in the overlapping or intersecting innermost portions 3a, 4a of the respective sockets 3, 4 whereby the components 7, 7b of each fastener means cooperate to bias the web 5A of the outer section 5 against the top wall or panel 6B of the inner section 6. At the same time, the surfaces bounding the sockets 3, 4 are biased against those parts of the carriers 2 which extend into the intersecting or overlapping innermost portions 3a, 4a of the respective sockets 3, 4. Consequently, the traverse 1 is safely held against any uncontrolled or accidental movement relative to the carriers 2, and the sections 5, 6 of such traverse are reliably held against any lengthwise an/or sidewise movement with reference to each other. The nuts 7b are closely adjacent to those parts of the carriers 2 which extend through the intersecting portions 3a, 4a of the corresponding sockets 3, 4. Since the screws 7 pull the sections 5, 6 against each other in a direction at right angles to the longitudinal direction of the traverse 1, and the elongated slot-like sockets 3, 4 make oblique angles with the respective sections 5 and 6, rotation of the screws 7 in a direction to urge the wall or panel 6B toward the web 5A of the section 5 automatically establishes a strong frictional (clamping) engagement between the surfaces bounding the innermost portions 3a, 4a of the sockets 3, 4 and those parts of the carriers 2 which extend through the respective sockets.

Figure 4:
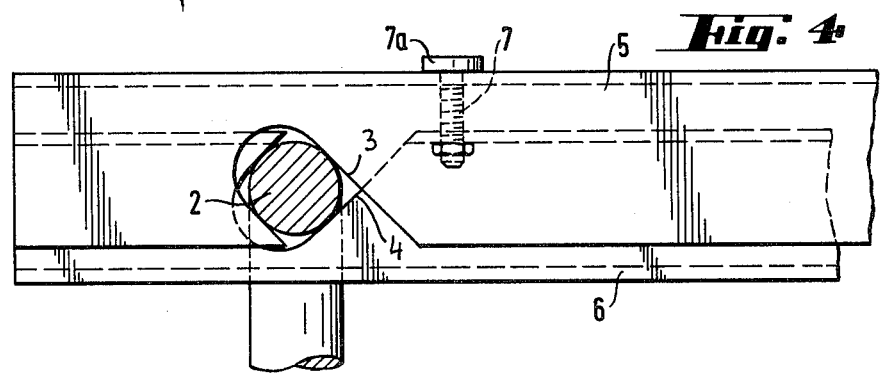
FIG. 4 is a fragmentary transverse vertical sectional view of a framework which constitutes a slight modification of the framework of FIGS. 1 to 3 in that the extent of contact between the sections of a traverse and at least one carrier of the framework deviates from that shown in FIG. 2.

As mentioned above, the traverse 1 which is shown in FIGS. 1 to 3 is designed in such a way that the carriers 2 extend through the innermost portions 3a, 4a of the respective sockets 3, 4. On the other hand, in the embodiment of FIG. 4 the external surface of that part of the illustrated carrier 2 which extends through the intersecting slot-shaped sockets 3, 4 is not received in the innermost portions of such sockets but rather in intersecting intermediate or median portions of the sockets. The result is similar or analogous to that with the traverse of FIG. 2, i.e., the surfaces bounding the sockets 3 and 4 are urged into strong frictional and clamping engagement with the corresponding part of the carrier 2 to thereby ensure that the traverse cannot become accidentally separated from the roof of the vehicle on which the carrier 2 is mounted. In FIG. 4, the surfaces bounding the sockets 3 and 4 engage the adjacent part of the carrier 2 at four sides which are angularly offset with reference to each other, namely, the section 5 engages two diametrically opposite sides of such part and the section 6 also engages two diametrically opposite sides of that part of the carrier which extends through the intersecting or overlapping intermediate portions of the sockets 3 and 4 shown in FIG. 4.

Referring again to FIGS. 1 to 3, and especially to FIG. 3, the width of the opening 8 at the underside 10 of the outer section 5 at least equals the width of the inner section 6 so that the latter can be readily admitted into or withdrawn from the section 5 by way of the opening 8. The opening 8 faces downwardly, i.e., toward the roof 20 of the vehicle which supports the carriers 2, in order to render it more difficult to gain access to the interior of the traverse 1, namely, to the interior of the section 5. This reduces the likelihood of unauthorized tampering with the screws 7 and unauthorized detachment of the traverse 1 from the carriers 2. As mentioned above, the traverse 1 may form part of a receptacle which can be locked to thereby prevent access to the head 7a of the screw 7 so that a burglar is not likely to be in a position to detach the traverse 1 from the carriers 2 by working from the upper side of the traverse.

The inner section 6 may be replaced with a lightweight section having a U-shaped or other cross-sectional outline, i.e., the inner section need not be a tube. However, the utilization of a tubular inner section in combination with a U-shaped outer section is often desirable and advantageous because the tubular inner section greatly enhances the rigidity and stability of the traverse 1 whereas the outer section which has a U-shaped cross-sectional outline allows for convenient assembly of the two sections and of the corresponding fastener means 7, 7b into a finished traverse. Such orientation of the outer section 5 that the opening 8 faces downwardly (toward the roof 20 of the vehicle) is desirable on the additional ground that foreign matter is much less likely to penetrate into and remain in the interior of the fully assembled traverse 1. If desired, the head 7a of each screw 7 can be designed in such a way that it can be engaged and rotated only by a specially designed tool (such as a specially designed screwdriver or wrench) so that an unauthorized person cannot readily detach the traverse 1 from the carriers 2 even if the heads 7a of both screws 7 are accessible at the upper side of the outer section 5. The utilization of sockets 3 whose width equals or approximates the width of the sockets 4 is desirable and advantageous when the carriers 2 have a circular cross-sectional outline and also because such sockets can be machined by resorting to one and the same material removing tool.

The reference characters 12 denote in FIG. 2 a pair of caps or covers which can be slipped onto the ends of the outer section 5 to further reduce the likelihood of penetration of rain, snow or other foreign matter into the interior of the fully assembled traverse. The caps 12 may consist of deformable synthetic plastic material which may be somewhat elastic and necessitates a certain amount of expansion in order to slip the caps onto the respective ends of the outer section 5. This renders it unnecessary to provide discrete fastener means for securing the caps 12 to the section 5.

FIG. 3 shows that the left-hand flange 13 of the outer section 5 faces in the direction of travel of the vehicle (the vehicle whose roof 20 supports the carriers 2 is assumed to travel in a direction to the left, as viewed in FIG. 3). In order to reduce the resistance to forward movement, at least the outer section 5, and especially the front flange 13 of the outer section 5, may have a streamlined profile. This is indicated in FIG. 3 by the rounded surface portion 13A between the front side of the left-hand flange 13 and the upper side of the web 5A of the outer section 5. Instead of imparting to the outer section 5 a configuration which entails at least some streamlining and hence a reduced resistance of the vehicle to travel in the forward direction, the outer section 5 can be provided with detachable profiling means (such as suitable sheathing or coating means) which is designed for the express purpose of reducing the resistance to movement in a direction to the left, as viewed in FIG. 3.

If the traverse 1 of FIGS. 1 to 3 forms part of or serves as a means for securing a receptacle to the carriers 2, the receptacle can be formed with a suitable groove to receive the traverse 1 so that the latter cannot offer any resistance to forward travel of the vehicle. The outline of the receptacle is then selected in such a way that the recepacle does not offer an excessive resistance to forward travel of the vehicle provided, of course, that the vehicle is of the type capable of traveling at speeds at which a streamlined configuration of the receptacle and/or traverse 1 is important or desirable.

Figure 5:
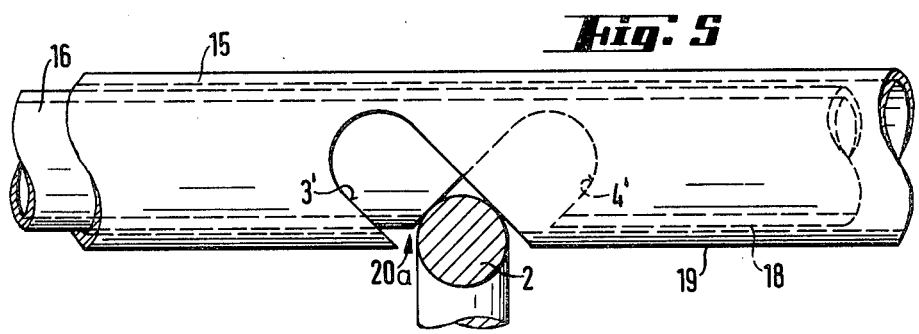
FIG. 5 is a fragmentary transverse vertical sectional view of a third framework wherein the illustrated traverse comprises tubular inner and outer sections and is shown in a position it assumes prior to attachment to the carriers.
Figure 6:
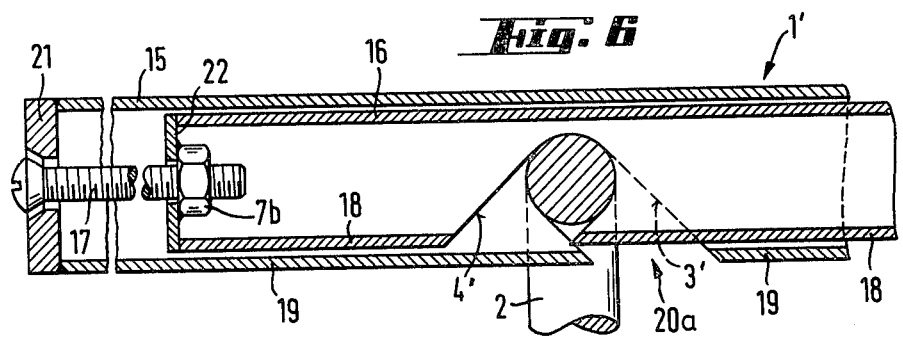
FIG. 6 illustrates the structure of FIG. 5 with the sections of the traverse shown in an axial sectional view and in positions they assume subsequent to attachment to the carriers of the framework.
Figure 6:
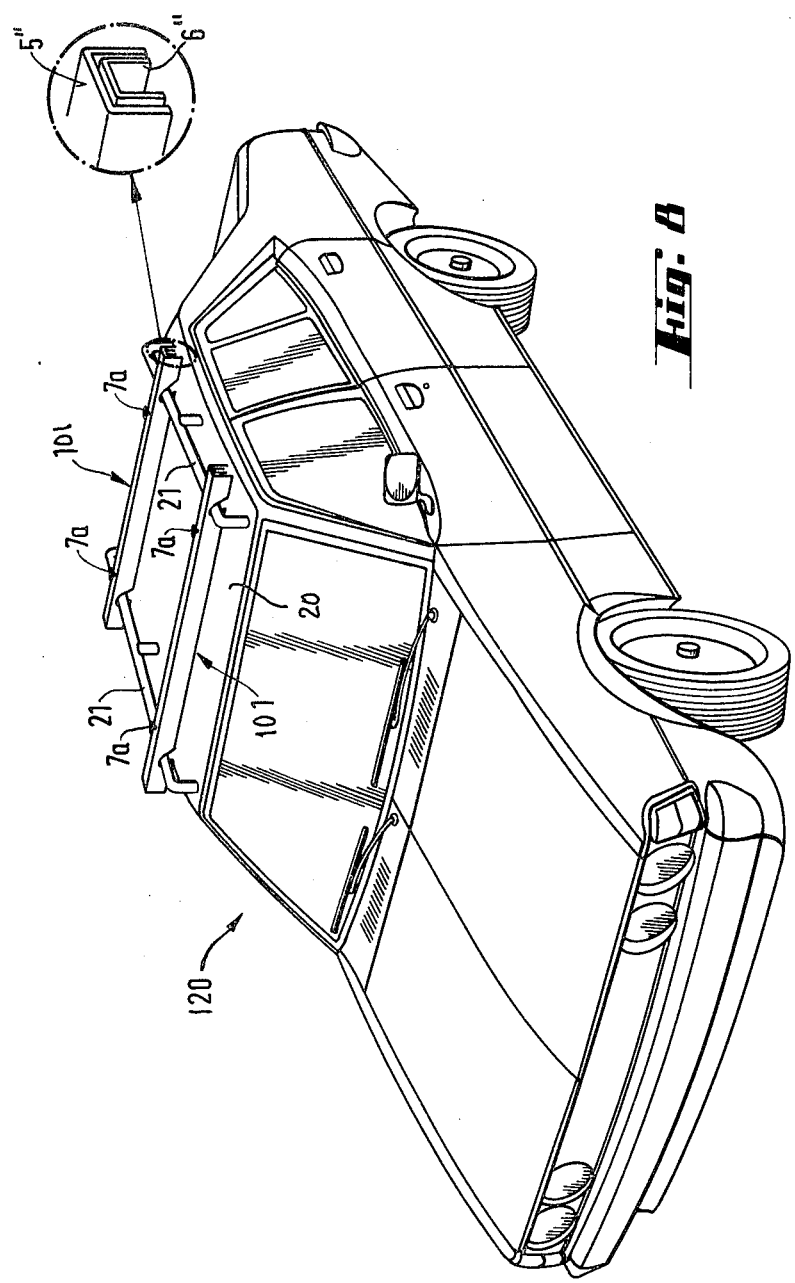

FIGS. 5 and 6 illustrate a portion of a further framework or rack which employs a modified traverse 1'. The sections of the traverse 1' are two tubes including an outer tube 15 and an inner tube 16 which is slidably telescoped into the outer tube. The sockets 3' and 4' are machined into or otherwise formed in the undersides 19 and 18 of the respective tubes 14, 16 and their inclination is the same as that of the sockets 3 and 4 shown in FIGS. 1 to 4. The open ends of the sockets 3' and 4' in the respective sides 19 and 18 are indicated at 20a. The fastener means of the traverse 1' comprises one or two externally threaded members 17 which are parallel with the longitudinal directions of the tubular sections 15, 16 and mesh with nuts 7b secured to the inner sides of end walls 22 of the inner tube 16 (only one end wall 22 is shown in FIG. 6). The head of the illustrated externally threaded member 17 bears against the outer side of an end wall (disc or late) 21 at the respective end of the tubular outer section 15.

If desired, the sections 15 and 16 can have an oval or a polygonal cross-sectional outline. An advantage of sections which constitute hollow circular cylinders (such as the sections 15 and 16 of FIGS. 5 and 6) is that they can be produced at a reasonable cost (i.e., by subdividing a pair of tubular workpieces into sections of desired length) and also that the inner section can be readily rotated in the outer section.

When the member 17 is tightened so that it pulls the end wall 22 toward the end wall 21, the surfaces bounding the sockets 3' and 4' bear against the adjacent part of the respective carrier 2 with a requisite force so that the traverse 1' is properly secured to the carrier. As in the embodiment of FIGS. 1 to 3, the carrier 2 extends into the innermost portions of the respective sockets 3' and 4' so that it is in pronounced surface-to-surface contact with both sections (15, 16) of the traverse 1'.

In assembling the framework or rack which includes the parts shown in FIGS. 5 and 6, the tubular sections 15 and 16 can be moved to the axial positions shown in FIG. 5 and the section 16 is thereupon moved axially relative to the section 15 and/or vice versa in a direction to allow the carrier 2 to penetrate into the respective sockets 3' and 4'. The externally threaded member 17 is thereupon drawn tight to hold the sections 15, 16 against axial movement relative to each other (or, at the very least, to hold the inner section 16 against movement in a direction to the right, as viewed in FIG. 6, while the section 15 is held against axial movement). This fixes the sections 15 and 16 to the carriers 2. It has been found that the frictional engagement between the surfaces bounding the sockets 3, 4 or 3', 4' and the respective carriers is sufficient to prevent uncontrolled shifting of the traverse 1 or 1' lengthwise of the carriers 2 as long as the fastener means 7, 7b or 17, 7b are drawn tight to hold the sections 5, 6 or 15, 16 against uncontrolled lengthwise and/or transverse movement relative to each other. If the owner of the vehicle desires to separate the traverse 1' from the carriers 2, the screw 17 is simply rotated in a direction to move the inner section 16 away from the end wall 21 until the carrier 2 can be slipped out of the corresponding sockets 3' and 4'.

The fact that the sections 15 and 16 are or can be hollow circular cylinders does not contribute to inconvenience of the assembly because, once a part of a carrier 2 enters the respective sockets 3' and 4', the carrier 2 holds the tubular sections 15 and 16 against undesirable angular displacement relative to each other and actually promotes axial movement of the section 15 relative to the section 16 and/or vice versa in a direction to enable the carrier to enter the deepmost or innermost portions of the corresponding sockets 3' and 4'.

FIG. 7 illustrates a portion of a framework or rack having a traverse 1" which is practically identical with the rack of FIGS. 1 to 3 except that the fastener means comprises a pair of first fasteners including screws 7 meshing with nuts 7b which are welded to the upper wall or panel 6B of the inner section 6a, and a fastener which is identical with that shown in FIG. 6. The section 6a has a pair of elongated apertures in the form of slits 7c (only one shown) which are provided in the panel 6B and serve to allow the section 6a to move lengthwise in response to rotation of the threaded member 17. Analogously, the end wall 21 of the outer section 5a has a vertical slit or aperture 17c which allows the section 6a to move up or down in response to rotation of the screw 7. The operator can manipulate the screws 7 and/or the threaded member 17 in order to move the section 6a to a desired position with reference to the section 5a and/or vice versa so that the surfaces bounding the intersecting slots or sockets 3, 4 properly engage the adjacent parts of the corresponding carriers 2.

The right-hand carrier 2 extends into the deepmost or innermost portions of the respective sockets 3 and 4. On the other hand, the left-hand carrier 2 is received in intersecting intermediate portions of the left-hand sockets 3 and 4 which are elongated slots extending at right angles to each other and making angles of approximately 45 degrees with the longitudinal directions of the respective sections 5a and 6a. The situation which is shown in FIG. 7 can arise when the distance between the carriers 2 deviates from a desired or optimum distance, namely, from the distance between the innermost portions of the sockets 3 or 4. It will be seen that the left-hand portions of the sections 5a and 6a can properly and safely engage the left-hand carrier 2 in spite of the fact that this carrier does not or cannot extend into the deepmost or innermost portions of the corresponding sockets 3 and 4. The traverse 1″ including the sections 5a and 6a of FIG. 7 is or may be slightly inclined with reference to a horizontal plane (provided that the vehicle including the roof 20 rests on a horizontal portion of a road or parking area); however, this is of no consequence because the inclination of the traverse 1″ with reference to a truly horizontal plane is negligible.

The inner section 6a of the traverse 1″ is open at its underside and the open ends of the respective sockets 4 are provided in such underside. Thus, the open ends of all of the slots or sockets 3 and 4 are located at the lower ends of the respective sockets, the same as in the embodiment of FIGS. 4 and 5. The section 6a may constitute a profiled metallic member which has a U-shaped cross-sectional outline. The width of the sockets 4 is the same as that of the sockets 3.

As mentioned hereinbefore, the sections of the improved traverse may be made of a variety of different materials including aluminum, aluminum alloys, stainless steel and/or others. It is also possible to make portions of or the entire traverse of a suitable synthetic plastic material which is sufficiently rigid to stand the stresses that develop in actual use of the rack. All that counts is that the material of the traverse should exhibit the desired rigidity and resistance to the corrosive influence of rain, snow, sleet, polluted air (especially combustion products), etc.

FIG. 8 illustrates an entire vehicle 120 having a roof 20 and two longitudinally extending parallel rod-like carriers 21 corresponding to the carriers 2 of FIGS. 1 to 7. As shown in the upper right-hand portion of FIG. 8, both sections (5″, 6″) of at least one of the two parallel transversely extending traverses 101 may have U-shaped cross-sectional outlines and the open sides of both sections preferably face downwardly to reduce the likelihood of penetration of foreign matter into and retention of such foreign matter in the interior of the respective traverses.

It goes without saying that the improved framework or rack may comprise three or more parallel or substantially parallel carriers 2 or 21 and one, three or more parallel or substantially parallel traverses. Also, each traverse or certain traverses can be assembled of two or more sections which are telescoped into each other.

An important advantage of the improved framework is that its traverse or traverses exhibit a very pronounced resistance to deformation owing to utilization of two or more sections which are telescoped into each other. Furthermore, the traverse or traverses are relatively simple, lightweight and inexpensive, and they can be readily attached to or separated from other parts of the rack. Still further, the mutually inclined sockets in the neighboring sections of a traverse render it possible to establish a form-locking as well as force-locking engagement with the carriers so that the rack can stand pronounced stresses without uncontrolled or undesirable shifting of traverses relative to the carriers and/or displacement of sections within a traverse relative to each other. This is desirable and advantageous when the vehicle is driven in stormy weather and/or at an elevated speed so that the traverse or traverses must withstand pronounced forces of winds or gales which tend to shift the traverses along the carriers.

A further important advantage of the improved framework is that its traverse or traverses can be readily secured to carriers having a circular or other cross-sectional outline and also that the traverses can be properly secured to the carriers even if the distance between the carriers and/or the spacing between the sockets of the inner and/or outer section of a traverse deviates from a predetermined optimum value. All that counts is to ensure that the sockets of the inner and outer sections overlap each other sufficiently to receive parts of the respective carriers in those portions which register with or overlap each other. The inclined surfaces flanking the sockets of the sections automatically center the respective traverse with reference to the carriers when the corresponding fastener means is or are applied with requisite force. As explained above, eventual minor deviations of the spacing between the carriers (or between the sockets of a section) from an optimum value may cause a properly mounted traverse to be slightly inclined with reference to a horizontal plane but the deviation is normally negligible so that it cannot be noticed at all or is not sufficiently pronounced to affect the appearance of the rack.

The utilization of mutually inclined sockets (such as the sockets 3 and 4 of the sections 5, 6 shown in FIGS. 1 to 3) is desirable and advantageous on the additional ground that such sockets automatically ensure proper retention of the corresponding traverse against any uncontrolled movement relative to the associated carriers and relative to the roof of the vehicle. Thus, the surfaces bounding such sockets can grip the external surfaces of adjacent parts of the carriers with sufficient force to hold the traverse against movement in the longitudinal direction of the vehicle. Furthermore, the surfaces bounding the sockets hold the traverse against lengthwise movement (i.e., at right angles to the longitudinal directions of the carriers) as well as against movement in a direction at right angles to the upper side of the roof, i.e., up or down, as viewed in FIG. 2.

The uitlization of sections (such as 5 or 6) whose sockets are elongated slots which are parallel to each other is desirable and advantageous because, as a rule, one of the sockets in a section will automatically receive the corresponding carrier when the other socket of the same section is properly oriented to receive a part of the other carrier. In fact, once the sockets 3 or 4 of a section 5 or 6 (or the sockets of another previously described section) partially receive the corresponding carriers, the section is automatically moved to the optimum final position with reference to the carriers as soon as the corresponding fasterener means are applied.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A framework, particularly a rack for storage of luggage, skis or other commodities on the roof of an automotive vehicle, comprising a plurality of spaced-apart elongated carriers; and a traverse extending traversely of said carriers and comprising a plurality of elongated sections telescoped into and movable relative to each other, said sections each having open-ended sockets comprising elongated slots and including registering portions for engaging parts of said carriers, wherein the slots on each of said carriers are inclined relative to each other and make an oblique angle relative to the longitudinal direction of the sections and, further wherein the slots of one of said sections intersect the slots of another of said sections and such slots have aligned zones which comprise the registering portions of the respective sockets; and fastener means for releasably securing said sections to each other.

2. The framework of claim 1, wherein said elongated slots make angles of approximately 45 degrees with the longitudinal directions of the respective sections.

3. The framework of claim 1, wherein the slots of each of said sections are parallel to each other.

4. The framework of claim 3, wherein said sections include a first and a second section.

5. The framework of claim 1, wherein said fastener means includes means for biasing said sections against each other in a direction substantially transversely of the longitudinal directions of such sections.

6. The framework of claim 1, wherein said fastener means includes at least one externally threaded member.

7. The framework of claim 1, wherein said fastener means includes at least one externally threaded fastener member adjacent to a part of one of said carriers and arranged to urge said sections against such part.

8. The framework of claim 7, wherein said fastener member includes means for biasing said sections against each other in a direction substantially at right angles to the longitudinal directions of such sections.

9. The framework of claim 1, wherein said sections include an outer section having a substantially U-shaped cross-sectional outline and an open side extending lengthwise of said outer section, and an inner section insertable into and removable from said outer section by way of said open side.

10. The framework of claim 9, wherein said open side is the underside of said outer section.

11. The framework of claim 10, wherein said carriers are elongated parallel bars secured to the roof of an automotive vehicle and said underside of said outer section faces the roof of the vehicle.

12. The framework of claim 1, wherein said sections include an inner section and an outer section at least partially surrounding said inner section, said inner section having a first side and said outer section having a second side substantially parallel and oppositely positioned relative to said first side, the open ends of the sockets of said inner section being provided in said first side and the open ends of sockets in said outer section being provided in said second side.

13. The framework of claim 1, wherein the width of slots in one of said sections at least approximates the width of slots in each other section.

14. The framework of claim 1, wherein said sections include a tubular inner section and an outer section at least partially surrounding said inner section.

15. The framework of claim 14, wherein said inner section has a polygonal cross-sectional outline.

16. The framework of claim 14, wherein said fastener means comprises at least one externally threaded member extending through said outer section and a nut provided on said inner section and meshing with said externally threaded member.

17. The framework of claim 1, wherein said carriers are parallel bars provided on the roof of an automotive vehicle and said sections extend substantially transversely of the direction of forward movement of the vehicle, said sections including an inner section and an outer section at least partially surrounding said inner section and having a side facing forwardly, as considered in said direction, said side of said outer section having a streamlined outline.

18. The framework of claim 17, wherein said outer section includes an additional side adjacent to said first mentioned side and said first mentioned side has a rounded portion merging into the said additional side.

19. The framework of claim 1, wherein said sections include a tubular outer section and an inner section movable axially of said outer section, said fastener means comprising means for moving one of said inner and outer sections axially of the other of said inner and outer sections.

20. The framework of claim 19, wherein said inner section is a tube.

21. The framework of claim 19, wherein said sections have sides facing in the same direction and adjacent to each other, the open ends of said slots being provided in said sides of the respective sections.

22. The framework of claim 19, wherein said outer section has an end wall and said inner section has an end wall adjacent to the end wall of said outer section, said fastener means including an externally threaded member extending axially of said sections through the end wall of said outer section and a nut provided on the end wall of said inner section and meshing with said externally threaded member.

23. The framework of claim 22, wherein the end wall of said outer section has an outer side and said externally threaded member has a head abutting against said outer side.

24. The framework of claim 1, wherein at least a portion of said traverse consists of a material selected from the group consisting of aluminum, aluminum alloys and stainless steel.

25. The framework of claim 1, wherein at least a portion of said traverse consists of corrosion-resistant material.

26. The framework of claim 1, wherein said sections include an inner section and an outer section at least partially surrounding said inner section, said sections having neighboring sides and the open ends of said slots being provided in said sides of the respective sections, the slots of one of said inner and outer sections intersecting the slots of the other of said inner and outer sections and said fastener means including means for moving said inner and outer sections relative to each other including in a direction which is parallel with and in a direction which is normal to the longitudinal directions of said inner and outer sections.

27. The framework of claim 26, wherein said means for moving said inner and outer sections relative to each other comprises at least one externally threaded member extending at right angles to the longitudinal directions of said sections and at least one externally threaded member extending in parallelism with the longitudinal directions of said sections.

28. The framework of claim 27, wherein said fastener means further comprises nuts provided on said inner section and meshing with the respective externally threaded members.

* * * * *